United States Patent [19]

Edwards et al.

[11] Patent Number: 5,626,000

[45] Date of Patent: May 6, 1997

[54] PACKAGING ARRANGEMENT

[75] Inventors: Russell J. Edwards; Richard W. Abrams, both of Jacksonville; William E. Holley, Ponte Vedra Beach, all of Fla.; Borge P. Gundersen, Tikob; Thomas C. Ravn, Helsignor, both of Denmark

[73] Assignee: Johnson & Johnson Vision Products, Inc., Jacksonville, Fla.

[21] Appl. No.: 257,787

[22] Filed: Jun. 10, 1994

[51] Int. Cl.⁶ ..................................................... B65B 3/04
[52] U.S. Cl. ..................... 53/281; 53/51; 53/64; 53/75; 53/239; 53/253; 53/284.5; 53/329.2; 53/499; 53/505
[58] Field of Search ..................... 294/65; 414/223, 414/225, 736, 737; 156/69, 292, 358, 583.1; 53/51, 64, 67, 75, 76, 503, 504, 505, 506, 499, 559, 239, 253, 267, 281, 282, 283, 284.5, 329.2, 374.8

[56] References Cited

U.S. PATENT DOCUMENTS

| | | | |
|---|---|---|---|
| 2,934,869 | 5/1960 | Engleson et al. | 53/67 |
| 3,112,590 | 12/1963 | O'Brien | 53/282 |
| 3,342,010 | 9/1967 | Henry | 53/471 |
| 3,411,767 | 11/1968 | Moser et al. | 53/64 X |
| 3,415,036 | 12/1968 | Beckers | 53/282 X |
| 3,418,785 | 12/1968 | Duryee | 53/374.8 X |
| 3,478,489 | 11/1969 | Meisner | 53/167 |
| 3,490,196 | 1/1970 | Sovensen | 53/64 X |
| 3,657,857 | 4/1972 | De Woskin et al. | 53/453 |
| 3,783,581 | 1/1974 | Pierce | 53/167 X |
| 3,946,537 | 3/1976 | Hair et al. | 53/559 |
| 4,048,781 | 9/1977 | Johansen | 53/471 X |
| 4,151,698 | 5/1979 | Muller et al. | 53/240 X |
| 4,297,828 | 11/1981 | Krieger et al. | 53/282 |
| 4,662,668 | 5/1987 | Hufford | 414/737 X |
| 4,691,820 | 9/1987 | Martinez . | |
| 4,722,169 | 2/1988 | DeSantis | 53/504 X |
| 4,819,413 | 4/1989 | Mancini | 53/478 |
| 4,976,091 | 12/1990 | Salemka et al. | 53/503 X |
| 5,155,981 | 10/1992 | Tordini | 414/737 X |
| 5,322,586 | 6/1994 | McLean | 156/358 |

Primary Examiner—Daniel Moon

[57] ABSTRACT

A packaging arrangement for packaging products, such as contact lenses, in packages such as blister packs. The packaging arrangement includes a rotary index table defining on its upper surface a plurality of identical, radially-oriented support pallets, equally spaced apart around the rotary index table. Each support pallet is designed to support an array of individual package bases thereon, and is sequentially rotated to stop at angularly spaced radial positions in the rotary packaging machine. At a first radial position, the rotary packaging station receives blister package bases, each having a product deposited therein, and places the package bases in the support pallet then at the first radial position. At subsequent radial positions, the rotary packaging machine verifies the presence and alignment of each package base, deposits a fixed dosage of saline solution into each package base, optionally verifies that a fixed dosage of saline solution has been deposited in each package base, places a marked laminated cover over the package bases, heat seals the laminated cover to the package bases, verifies the proper positional placement of the laminated cover on the package bases, and finally unloads the completed blister packs from the rotary packaging station, for subsequent processing such as sterilization and secondary packaging.

26 Claims, 10 Drawing Sheets

PACKAGING ARRANGEMENT

BACKGROUND OF THE INVENTION

1. Field of the Invention

The present invention relates generally to a packaging arrangement for packaging products, such as contact lenses, in packages such as blister packs. More particularly, the subject invention pertains to a packaging arrangement having a movable support base, such as a rotary index table, defining on its upper surface a plurality of identical support pallets, equally spaced apart along the movable support base. Each support pallet is designed to support an array of individual package bases thereon, and is sequentially stopped at spaced positions in the packaging arrangement. At a first position, the packaging arrangement receives blister package bases, each having a product deposited therein, and places the package bases in the support pallet then at the first position. At subsequent positions, the packaging arrangement verifies the presence and alignment of each package base, deposits a fixed dosage of saline solution into each package base, optionally verifies that a fixed dosage of saline solution has been deposited in each package base, places a marked laminated cover over the package bases, heat seals the laminated cover to the package bases, and finally unloads the completed blister packs from the packaging arrangement, for subsequent processing such as sterilization and secondary packaging.

2. Discussion of the Prior Art

The prior art discloses the use of rotary index tables and also linear conveyor arrangements in packaging equipment, the packaging of contact lens in saline solution, and the checking of various packages by a variety of optical probes. Moreover, the prior art also discloses heat sealing lids or covers to container bases, but in the prior art methods of heat sealing, the temperature of the sealing heads are generally maintained at lower temperatures, and the sealing heads are generally applied for longer periods of time as compared with the present invention. In one prior art approach, a pneumatic cylinder presses a heated sealing head against the covers being applied to package bases on a rotary index table, and a microswitch measures when the pneumatic cylinder is at the end of its power stroke, which starts a measured heater timing period. This approach is very inaccurate as the tolerances of all of the components, including the rotary index table, the pneumatic cylinder, and the height of the package and foil in the pallet creates timing problems.

Rather than detecting a particular physical position of the pneumatic press as in the prior art, the present invention measures the force applied by a pneumatic cylinder, and activates a timer when the measured force reaches a threshold force, which is approximately 75% of the maximum force generated by the pneumatic cylinder. Moreover, the present invention positions a support below the rotary index table to ensure that deflections under the pneumatic press are minimized.

SUMMARY OF THE INVENTION

Accordingly, it is a primary object of the present invention to provide a packaging arrangement for packaging products, such as contact lenses, in packages such as blister packs.

A further object of the subject invention is the provision of a packaging arrangement having a movable support base, such as a rotary index table, defining on its upper surface a plurality of identical support pallets, equally spaced apart along the movable support base. Each support pallet is designed to support an array of individual blister package bases thereon, and is sequentially rotated to stop at spaced positions in the lens packaging arrangement, at which a sequence of packaging operations are performed thereon.

In accordance with the teachings herein, the present invention provides a packaging arrangement for packaging products such as contact lenses in packages such as blister packs. The packaging arrangement includes a movable support base having on its upper surface a plurality of identical support pallets, equally spaced apart along the movable support base. Each support pallet is particularly designed to support and align an array of individual package bases. The movable support base is sequentially moved through substantially equal increments, with stops between each sequential movement. The arrangement is such that each support pallet with an array of individual package bases thereon is sequentially stopped at a plurality of spaced stations in the packaging arrangement. At a first station, a robotic handling arm loads an array of package bases into a support pallet then at the first station. At a subsequent verification station, probes verify the presence and alignment of each package base in the support pallet. At a subsequent saline dosing station, dosers deposit a given dosage of saline solution in each package base. At a subsequent foil placement station, a pick and place unit places a pair of sheets of laminated covers over the array of package bases. At a subsequent heat sealing station, a heated seal head heat seals the laminated covers to the package bases. Finally, at an unloading station, an unloader arm unloads the sealed packages from the packaging arrangement for subsequent processing.

In greater detail, at the first station, the packaging arrangement receives individual blister package bases, each of which has a contact lens therein, and the packaging arrangement packages the contact lenses into blister packs.

In a preferred embodiment, the movable support base comprises a rotary index table having on its upper surface eight identical, radially-spaced support pallets, positioned 45° apart around the table, each of which is particularly designed to support an array of 2×5 package bases.

The packaging arrangement receives individual package bases, each of which has a product therein, which are lined up and queued for packaging on side by side accumulator rails. The package bases are precisely positioned on the side by side accumulator rails such that a robotic handling arm, having an array of vacuum handling cups, one for each individual package base, can pick up an array of package bases from the accumulator rails and deposit them onto a support pallet at the first station on the movable support base. Also, when the packaging arrangement is temporarily not operating, the robotic handling arm also transfers package bases from the accumulator rails to a buffer area. After the package bases are deposited onto one end of the side by side accumulator rails, first and second pneumatic cylinders advance the package bases to the second opposite end of the accumulator rails. A third pneumatic cylinder at the second end of the accumulator rails then pushes the package bases back slightly towards the first end to precisely position the package bases at the second end of the accumulator rails to allow the robotic handling arm to pick up an array of package bases.

The support pallet spaces the side of each package base a nominal distance, in a range of 200 to 400 μmeters, from the side of each adjacent package base in the support pallet, to prevent overlapping sides of adjacent product bases. The side by side accumulator rails accumulate package bases in positions in which package bases directly touch adjacent package bases. To compensate for the slight difference from the nominal distance between adjacent package bases in the pallet, the robotic arm, after positioning an array of package bases over a pallet, releases the vacuum in each vacuum cup to allow the package bases to fall into the support pallet. The robotic arm then raises and lowers the array of suction cups slightly to tap each package base into a properly aligned position in the support pallet. Each package base includes a rounded product cavity and alignment notches on opposite sides thereof. The support pallet defines a rounded cavity for receiving each product cavity of each package base and alignment rods which fit into the alignment notches on the package base.

At the verification station, probes verify the presence of each package base in the array of package bases supported by the pallet. The verifying probes include an array of fiber optic probes positioned above the array of package bases, with each fiber optic probe illuminating a package base, and then detecting radiation reflected therefrom to verify the presence of a package base in the support pallet. In greater detail, each fiber optic probe comprises a dual optical fiber arrangement in which one optical fiber carries light to illuminate the package base, and a second optical fiber carries light reflected from the package base to a photodetector. Moreover, at least one alignment probe verifies the alignment of the packaging bases in the support pallet to check that no package bases are skewed or tilted in the support pallet. Each alignment probe includes a throughbeam detector which directs a beam of light along the length of and just above a column of package bases supported in the pallet to a detector at the other end of the column, such that a package base which is skewed or tilted in the pallet interrupts the through beam, and the photodetector at the other end of the through beam so indicates.

At the saline dosing station, a pivotable arm supports an array of dosing tubes, each of which is supplied by a separate dosing pump to deposit a precise dosage of saline solution into each package base, such that each contact lens is immersed in saline solution. A pump cart is positioned adjacent to the saline dosing station and mounts thereon the dosing pumps and a reservoir of saline solution for the dosing pumps. Periodically, the support arm is rotated to one side to position the dosing tubes over a collection pan, and the reservoir in the pump cart is refilled. Each pump is cycled several times, with the discharge from the dosing tubes being collected in the collection pan, to compensate for evaporation of saline solution and to ensure that the proper dosage amount is provided.

Moreover, optionally after the saline dosing station, at a subsequent dosing verification station, an array of sensors verifies that a given dosage (level of solution) of saline solution has been deposited into each package base.

At the foil placement station, a foil pick and place unit, having an array of suction cups, lifts and places a pair of sheets of laminated covers over the array of package bases.

At the heat sealing station, an electrically heated seal head is pressed by a pneumatic cylinder against the laminated covers on the package bases. A thermal transducer measures the temperature of the seal head to maintain the temperature in a range from 210°–265° C. An in-line load cell measures the force generated by the pneumatic cylinder, and when a predetermined force is reached, which is a percentage of a possible maximum force, a timer is initiated. The timer times a relatively short time period of approximately 0.4 to 1.4 seconds, after which the pressure in the pneumatic cylinder is released, thereby forming a seal between each laminated cover and package base which is both detachable and consumer friendly. The predetermined force is a given percentage, e.g., 60–75%, of a maximum force that the pneumatic cylinder is capable of generating.

The rotary index table must be maintained in a substantially level position for the operations performed thereon, and is reinforced under the heat sealing station to withstand the forces imparted thereto by the pneumatic sealing cylinder. The reinforcement is provided by a block of durable plastic material, such as a Teflon® type of plastic, placed on top of a support positioned beneath the rotary index table at the pneumatic cylinder. The support block is in constant contact with the bottom of the rotary index table to ensure that the deflection of the rotary index table by the pneumatic cylinder is minimal. Alternatively, a pneumatically actuated movable support can be positioned in contact with the bottom of the rotary index table prior to actuation of the pneumatic cylinder driving the heated seal head, and be removed from contact with the bottom of the rotary index table subsequent to actuation of the pneumatic cylinder.

At the unloading station, a pneumatically driven handling arm, having a vacuum suction cup for each individual package, lifts the array of packages from the support pallet, and deposits the array of packages at an output position. The handling arm incorporates thereon a precision sensor plate having a plurality of photoelectric sensors which examine the outer edges of each sheet of laminated covers on the array of packages to determine if a sheet of laminated covers is skewed relative to the array of packages. The photoelectric sensors are preferably positioned at the corners of the expected position of the sheet of laminated covers on the array.

The present invention also provides a method of heat sealing a laminated top cover to a plurality of individual package bases to create a sealed package with a seal which is durable, to survive subsequent packaging operations such as sterilization, and yet consumer friendly in that a consumer can easily separate and open the sealed package. Pursuant to the method, a laminated sealing cover is placed over an array of individual, unconnected package bases. A seal head is heated to maintain the temperature thereof in a range from 210°–265° C., and the heated seal head is pressed by a pneumatic cylinder against the laminated covers on the package bases. In greater detail, the force generated by the pneumatic cylinder is measured by an in-line load cell, and a timer is initiated when a predetermined force is reached. The timer times a relatively short time period of approximately 0.4 to 1.4 seconds, after which the pressure in the pneumatic cylinder is released, thereby forming a seal between each laminated cover and package base which is both detachable and consumer friendly. The array of individual package bases is supported in a pallet, wherein the support pallet spaces the side of each package base a nominal distance, in the range of 200 to 400 μmeters, from the side of each adjacent package base in the support pallet, to prevent overlapping sides of adjacent product bases, and to provide for each separation of individual packages. Each package base is provided with a rounded product cavity and alignment notches on opposite sides thereof, and the support pallet is provided with a rounded cavity for receiving each product cavity of each package base and alignment rods which fit into the alignment notches on each package base.

The present invention also provides a method of packaging in which an array of individual, unconnected package bases is placed in a support pallet by a robotic handling arm, having a suction cup for each package base. The support pallet spaces the side of each package base a nominal distance, in the range of 200 to 400 μmeters, from the side of each adjacent package base in the support pallet, to prevent overlapping sides of adjacent product bases, and to provide for easy separation of individual packages. A sheet of laminated top covers is placed over the array of individual package base, and the laminated top covers are sealed to the array of individual package bases. In greater detail, the package bases are initially in positions in which they directly touch adjacent package bases. To compensate for the slight difference in spacing from the nominal distance between adjacent package bases in the support pallet, the robotic arm, after positioning an array of package bases over a pallet, releases the vacuum in each vacuum cup to allow the package bases to fall into the support pallet. The robotic arm then raises and lowers the array of suction cups slightly to tap each package base into a properly aligned position in the support pallet.

BRIEF DESCRIPTION OF THE DRAWINGS

The foregoing objects and advantages of the present invention for a packaging arrangement may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
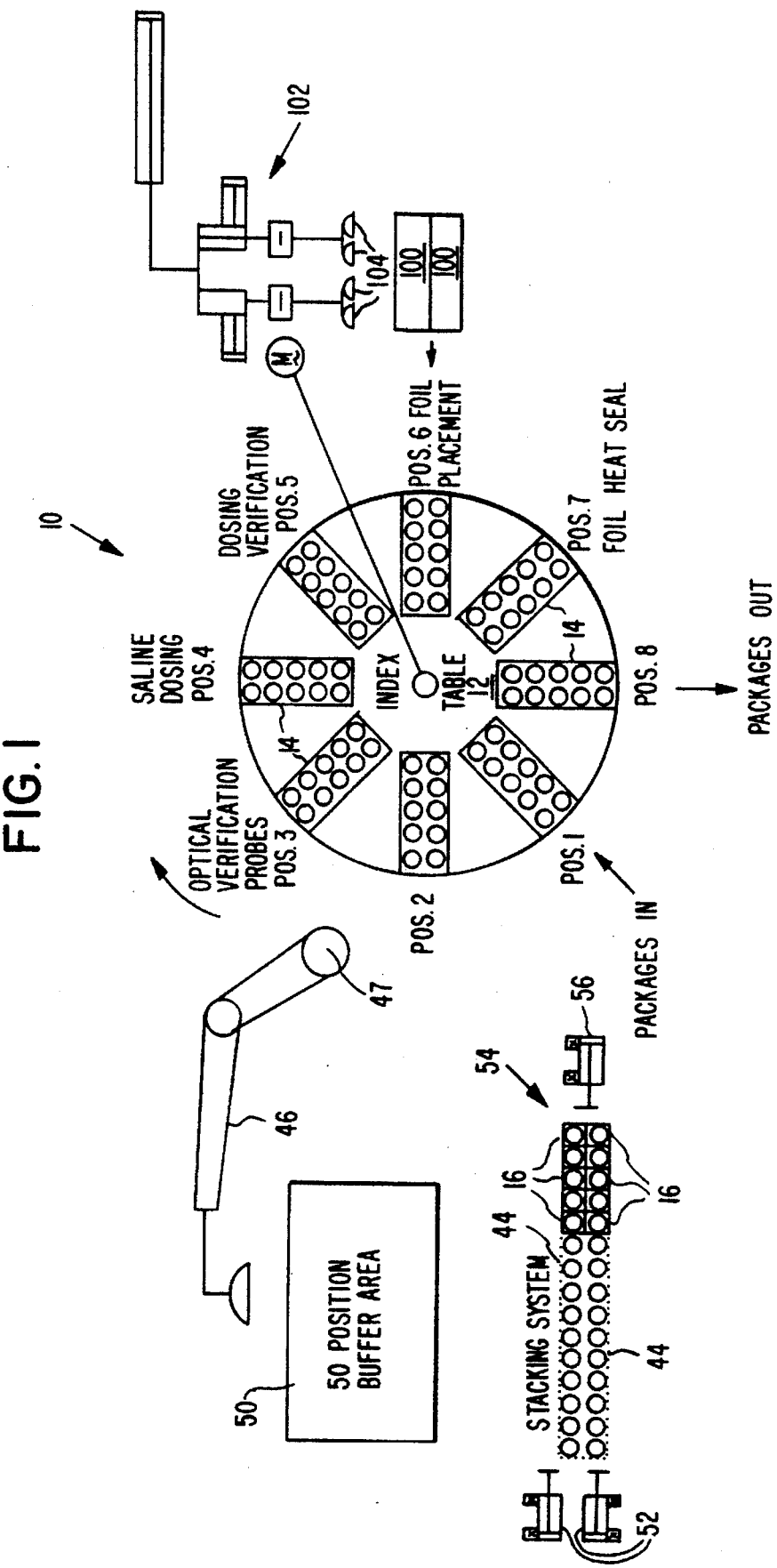
FIG. 1 is a schematic top plan view of a rotary packaging arrangement constructed pursuant to the teachings of the present invention.

Referring to the drawings in detail, FIG. 1 is a schematic plan view of a packaging arrangement 10 constructed pursuant to the teachings of the present invention, for packaging products, such as contact lenses, into packages such as blister packs. The packaging arrangement is illustrated as a rotary packaging machine having a plurality of radially spaced stations therearound. However, linear packaging arrangements having linear conveyor lines with linearly spaced stations therealong are also contemplated in alternative embodiments of the present invention.

The rotary packaging station 10 includes a rotary index table 12 which has on its upper surface eight identical, radially-oriented support pallets 14, positioned 45° apart around the table, each of which is particularly designed to support an array of individual blister pack bases 16. Each support pallet 14 with an array of individual blister pack bases thereon is sequentially rotated to stop at eight angularly spaced radial positions in the lens packaging machine, illustrated in FIG. 1 as POS.1 through POS.8.

Figure 5:
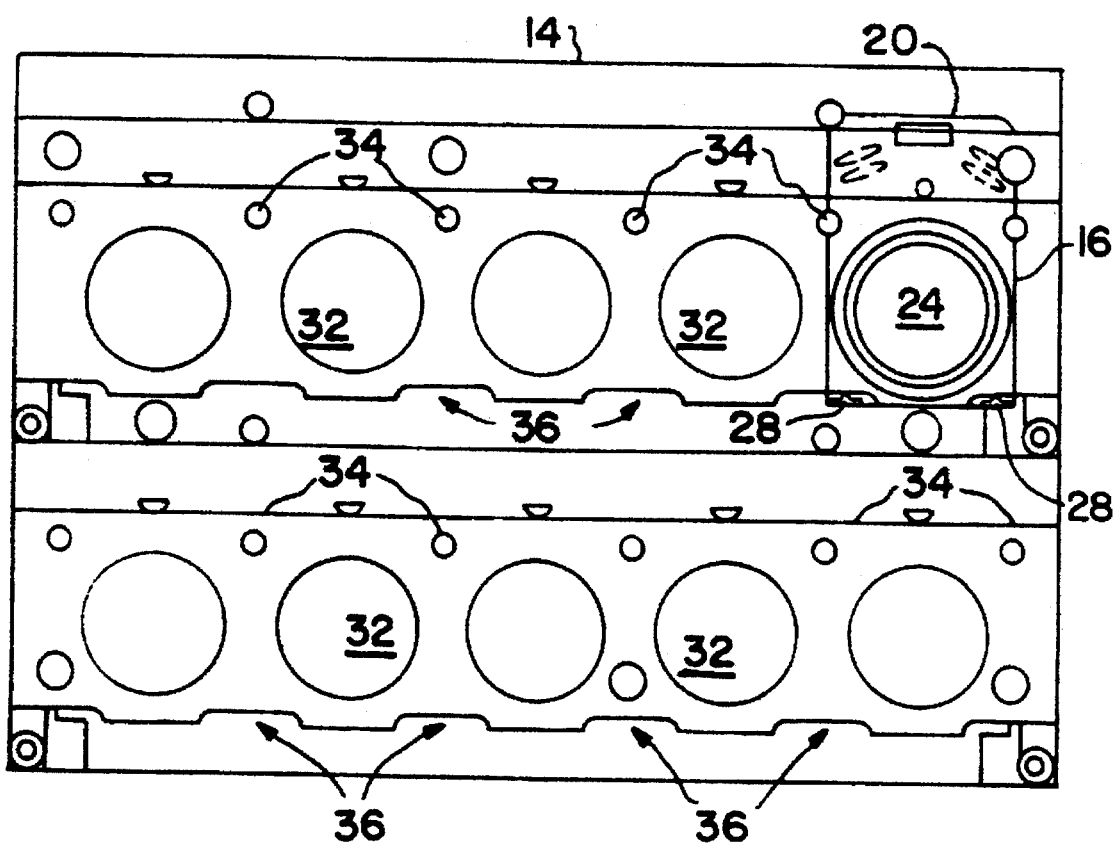
FIG. 5 is a top plan view of one support pallet for supporting a 2×5 array of package bases on the rotary index table of the rotary packaging arrangement.
Figure 7:
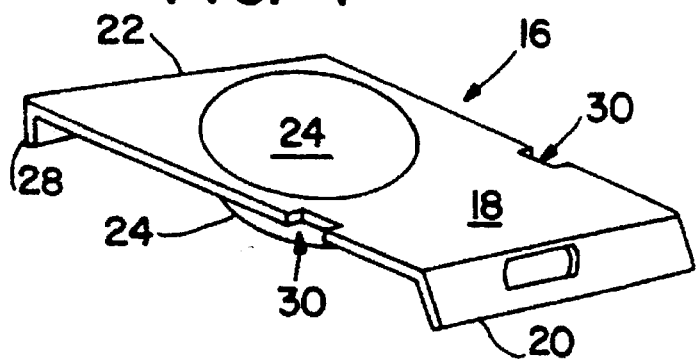
FIGS. 7 and 8 are respectively perspective and top planar views of a representative blister package base.
Figure 8:
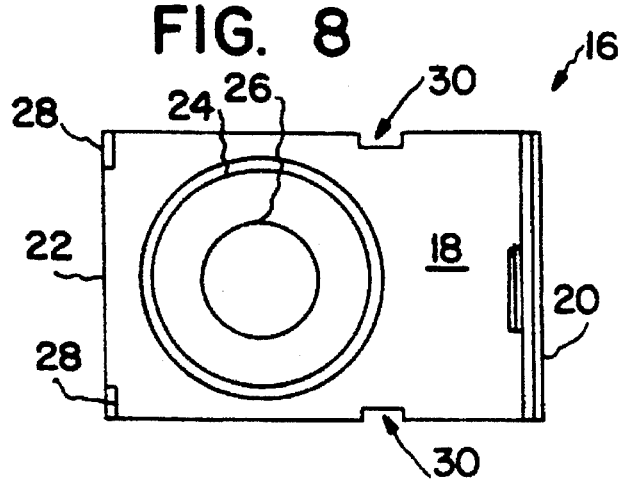
Figure 6:
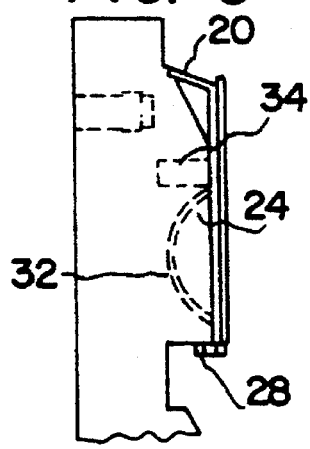
FIG. 6 is a fragmentary end view of one half of the support pallet illustrated in FIG. 5.

Each blister package base 16, as represented in further detail in FIGS. 6, 7 and 8 of the drawings, includes a planar, essentially rectangularly shaped flange 18 having an integral angularly depending wall portion 20 at one end thereof. A cavity 24 is formed offset towards an opposite edge 22 of the flange 18, which is of an essentially semispherical configuration, generally in conformance with the curvilinear shape of a contact lens 26, FIG. 8, adapted to be stored therein in a sealed condition while immersed in a suitable sterile aqueous solution. The height of the angled wall portion 20 depending from the planar flange 18 is somewhat analogous to the height or depth of the cavity 24 containing the contact lens, as can be ascertained more clearly from FIGS. 6 and 7 of the drawings. Each package base further includes depending legs 28 at each corner of side 22, opposite to the side with depending wall portion 20, and alignment notches 30 on opposite sides of the planar flange 18. Each support pallet 14 defines a rounded cavity 32 for receiving each product cavity 24 of each package base, alignment rods 34 which fit into the alignment notches 30, and insets 36 which receive the depending legs 28 of adjacent package bases 26, as illustrated best in FIG. 5.

Each blister pack base 16 may be a shaped injection-molded plastic structure, which may be constituted of polypropylene, of generally rigid or semi-rigid configuration. A lid is adapted to be secured or bonded, such as by heat sealing to the flange 18 surfaces around the product-receiving cavity. Each lid may comprise a multi-layered foil laminate, as disclosed in U.S. patent application Ser. No. 08/106,386, filed Aug. 13, 1993 now abandoned. The metallic foil laminate preferably includes a polypropylene bottom layer which is adapted to be bonded to contiguous sealing surfaces on the injection-molded shaped plastic package base, as by heat sealing or the like, to form a complete packaging structure as is well known in the packaging technology. A "blister package" of this type is disclosed, for example, in U.S. Pat. No. 4,691,820, commonly assigned to the assignee of this application. Through the intermediary of thermal transfer printing, appropriately variable and changeable printed data are imparted to an exterior surface of the foil laminate. When the laminate is severed into lid-forming labels for respective packages, the data may consist of suitable changeable lot numbers, expiration dates, and other physical data representative of the specific product housed in the package, for instance, data with regard to the power of a contact lens which is packaged in a cavity of the blister pack while immersed in a suitable protective sterilized saline solution.

Referring to FIG. 1, at a first radial position designated POS 1, the rotary packaging station receives blister package bases 16, each having a contact lens 26 deposited therein, and places the package bases in the support pallet 14 then at the first position.

The lens packaging station receives individual blister package bases, each of which has a contact lens therein, which are lined up and queued for packaging on two side by side accumulator rails 44. In order to successfully accumulate the package bases on the accumulator rails, the packages are held down by a vacuum supplied by a vacuum pump with a pressure down to 300 mbar. The blister pack bases are initially deposited onto the left end of the side by side accumulator rails 44 by a further good/bad robotic arm, not illustrated. The package bases are precisely positioned on the accumulator rails 44 such that a robotic handling arm 46, having a 2×5 array of vacuum handling cups 48, one for each individual blister pack base, can pick up a 2×5 array of individual blister pack bases 16 and load the blister pack bases onto a pallet 14 on the rotary packaging machine. Each pallet 14 is particularly designed to support and align the 2×5 array of blister packs, as described in greater detail hereinabove. Also, when the rotary packaging station 10 is temporarily shut down, as for changing foil rolls in an adjacent foil machine, the robotic handling arm 46 also transfers package bases 16 from the accumulator rails 44 to a buffer area 50. After the package bases are deposited onto one end of the side by side accumulator rails 44, two pneumatic cylinders 52 advance the package bases 16 to the second opposite end 54 of the accumulator rails. A third pneumatic cylinder 56 at the second end of the accumulator rails then pushes the package bases back slightly to the left to precisely position the package bases at the second end of the accumulator rails to allow the robotic handling arm 46 to pick up an array of package bases.

Each support pallet 14 has a unique design relative to prior art support pallets, in that the package bases are nominally positioned in the support pallet with a greater separation, in the range of 200 to 400 μmeters, between the shoulders of adjacent package bases, with the separation being provided to prevent a "shingling" effect in which a shoulder of one package base overlies a shoulder of an adjacent package base. The greater separation also aids in subsequent separation of the resultant adjacent blister packs. The support pallet 14 spaces the side of each package base 16 a nominal distance, in the range of 200 to 400 μmeters, from the side of each adjacent package base in the support pallet, to prevent overlapping edges of adjacent product bases. However, the side by side accumulator rails 44 accumulate package bases 16 in positions in which package bases directly touch adjacent package bases 16, as illustrated in FIG. 1. To compensate for the slight difference from the nominal distance between adjacent package bases in the pallet, the robotic arm 46, after positioning an array of package bases over a pallet 14, initially releases the vacuum in each vacuum cup 48 to allow the package bases to fall into the support pallet 14. The robotic arm 46 then raises and lowers the array of suction cups 48 slightly to tap each package base 16 into a properly aligned position in the support pallet 14, as provided for by the rounded product cavity aligning with respect to the cavity 32, the alignment notches 30 aligning with respect to the alignment rods 34, and the legs 28 aligning with respect to the inserts 36.

The rotary index table is then sequentially rotated through the successive angular positions, stopping for approximately 10 seconds at each radial station, such that all the operations as described herein can be performed simultaneously at the successive radial stations. At the second angular position, a vacuum is applied beneath each cavity 32 in the support pallet 14 to ensure that each package base 16 is properly positioned therein.

Figure 2:
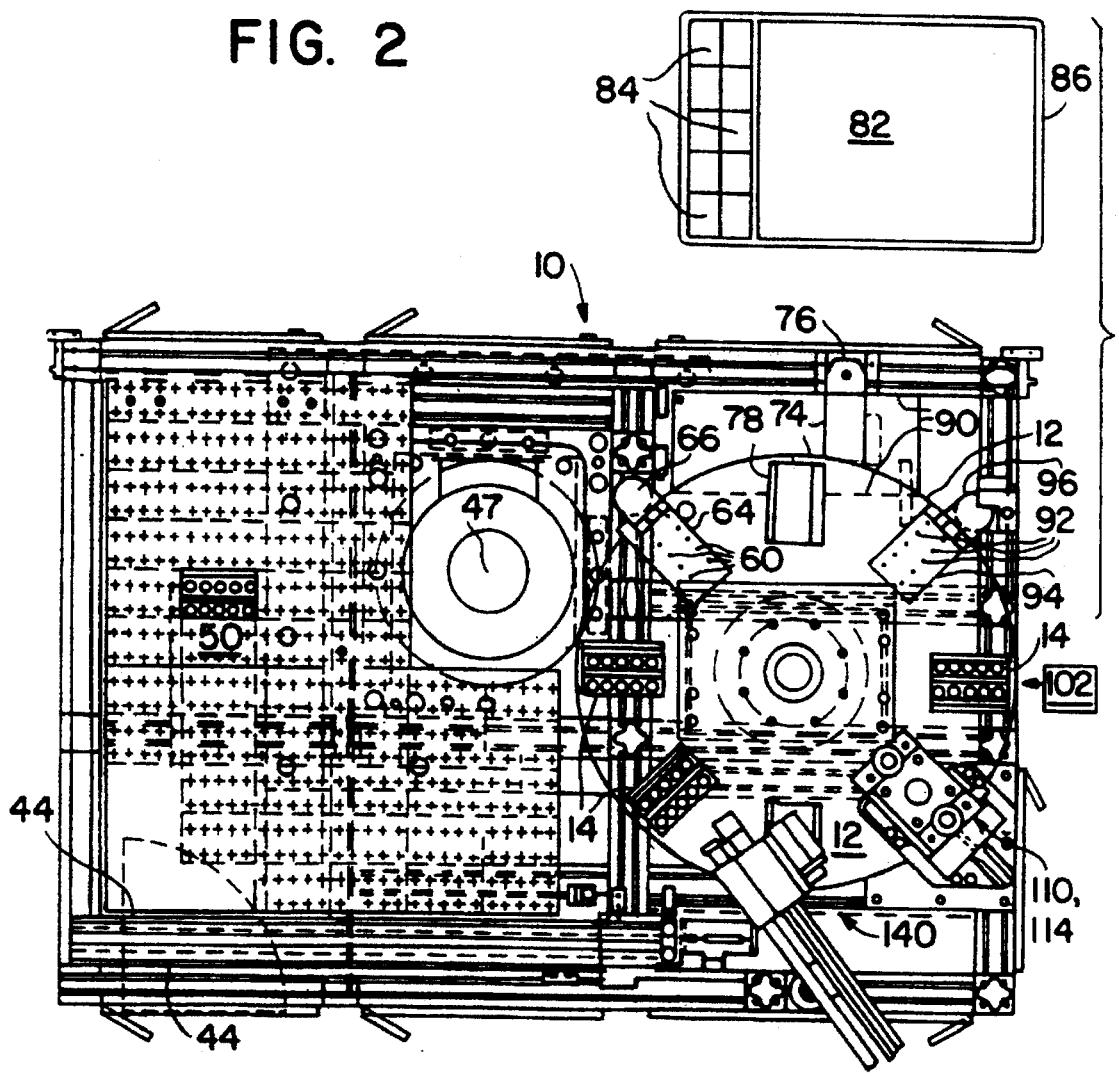
FIG. 2 is a top plan view, similar to FIG. 1, of one designed embodiment of a rotary packaging arrangement constructed pursuant to the teachings of the subject invention.
Figure 9:
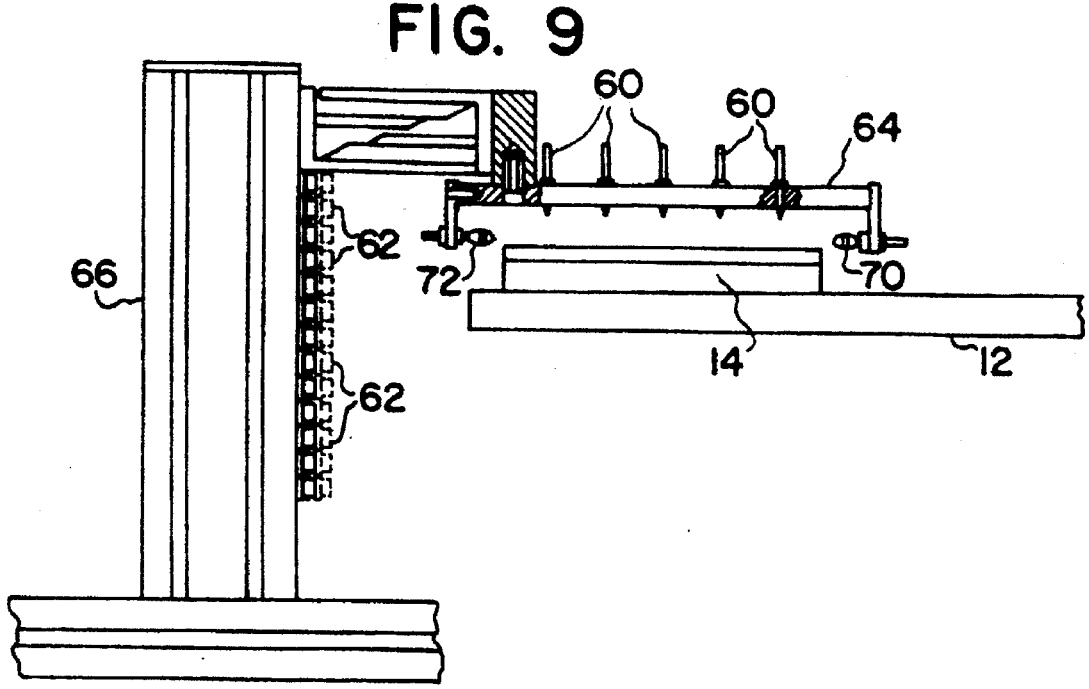
FIG. 9 is an elevational view of optical probes for verifying the presence of a packet base at each location in the 2×5 array, and also for checking the alignment of the packet bases in the 2×5 array to ensure that no packet bases are skewed or tilted in the support pallet.
Figure 12:
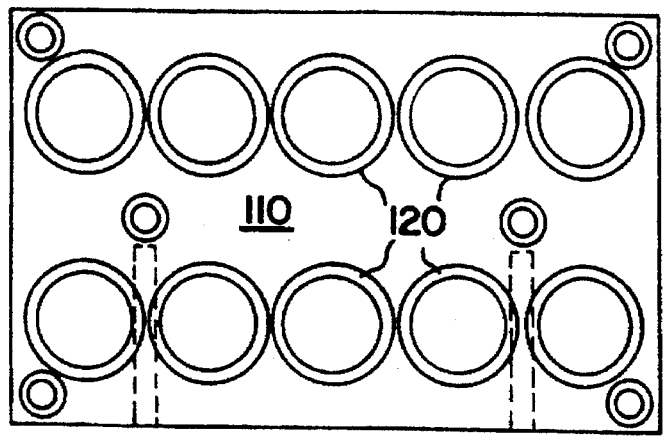
FIGS. 12 and 13 are respectively a bottom plan view and a side elevational view of the heat sealing head and an electrical heater therefor.
Figure 13:
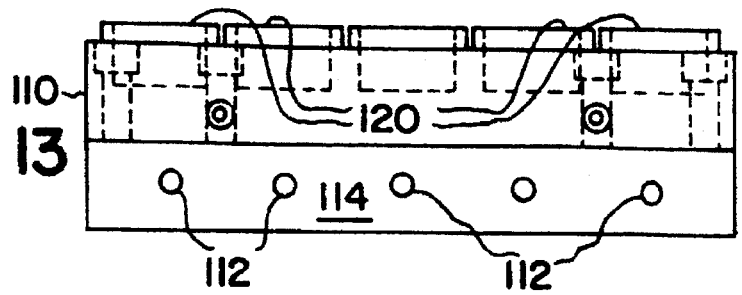
Figure 10:
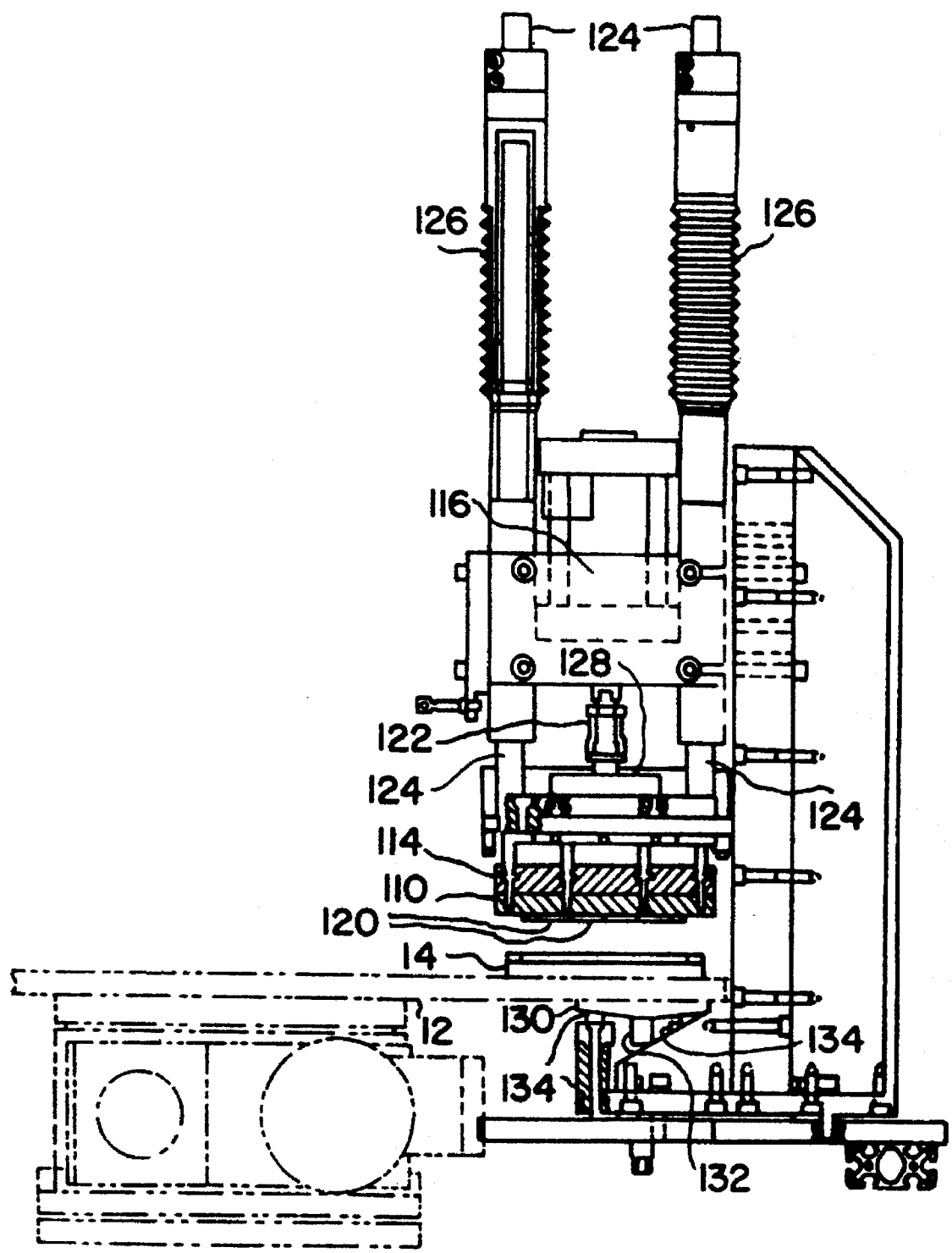
FIGS. 10 and 11 are respectively front and side elevational views of the heat sealing head and the pneumatic press therefor.
Figure 11:
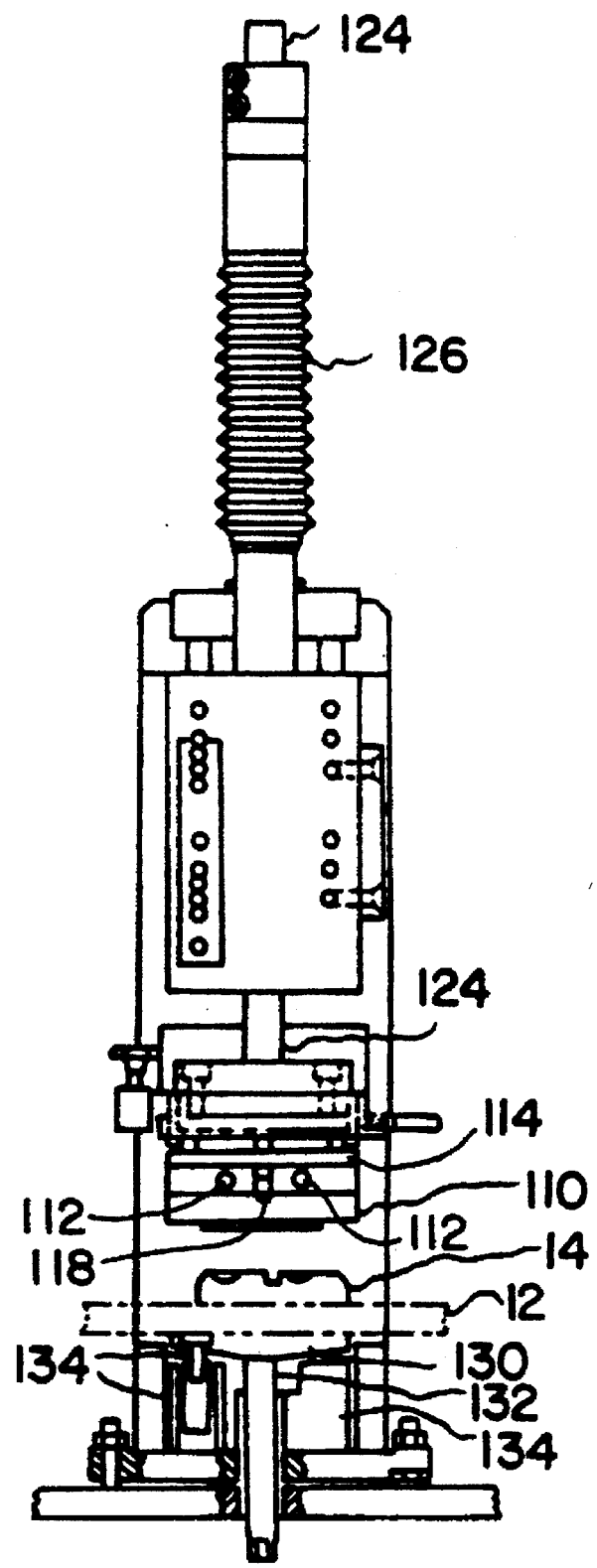

At the third angular position, a 2×5 array of fiber optic probes 60, FIGS. 2 and 9, are positioned above the 2×5 array of package bases to verify the presence of each package base in the array of package bases supported by the pallet. Each fiber optic probe 60 is positioned centrally over the open flange 18 area illustrated on the right side of FIG. 8 of each blister package base 16, and the fiber optic probe 60 illuminates each package base 16, and then detects the radiation reflected therefrom to verify the presence of each blister pack base 16. The fiber optic probes 60 can be of a type available commercially from Keyence, model FU-35f, utilized with an amplifier 62, model FS2-60. Each such fiber optic detector probe 60 comprises a dual optical fiber arrangement in which one optical fiber carries light to illuminate the flange 18 of each package base 16 and a second optical fiber carries light reflected from the package base to a photodetector. Each fiber optic probe 60 is positioned in a support plate 64 which is pivotally supported on a column 66, such that the support plate 64 may be placed in an operative position as illustrated in FIGS. 2 and 9, or pivoted to a position not over the rotary index table 12. The amplifiers 62 can be mounted on the column 68 as illustrated in FIG. 9.

An alignment check is also made at the third angular position to check that no package bases 16 are skewed or tilted in the support pallet 14. The alignment check is performed by two through-beam detectors, as are available commercially from Keyence, each of which includes a light source 70, FIG. 9, which directs a beam of light along the length of and just above a 1×5 column of package bases 16 supported in the pallet 14 to a detector 72 at the other end of the column. If a package base 16 is skewed or tilted in the pallet 14, it will interrupt the through beam, and the photodetector 72 at the other end of the through beam will so indicate.

Figure 3:
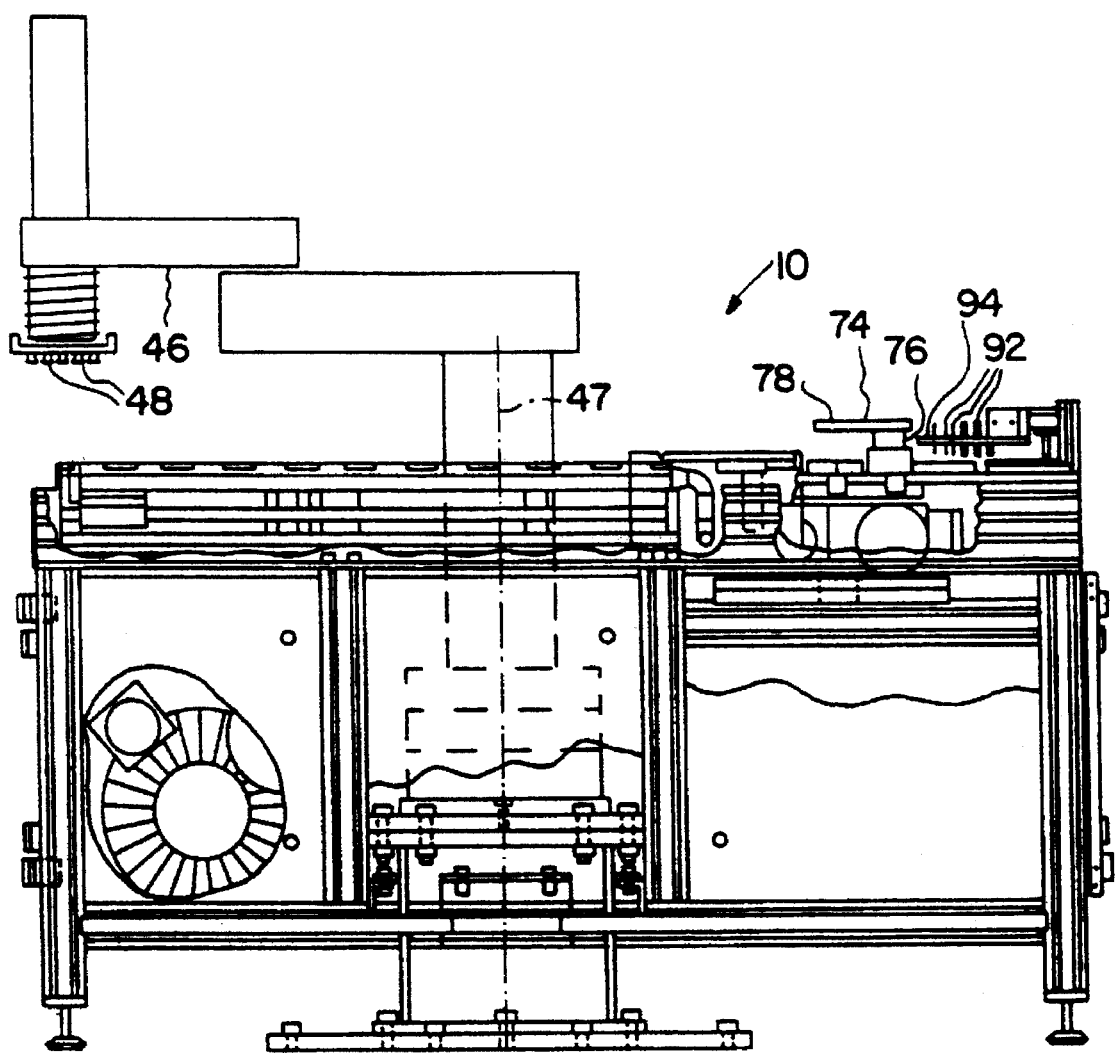
FIG. 3 is a front elevational view of the designed embodiment of a rotary packaging arrangement illustrated in FIG. 2.
Figure 4:
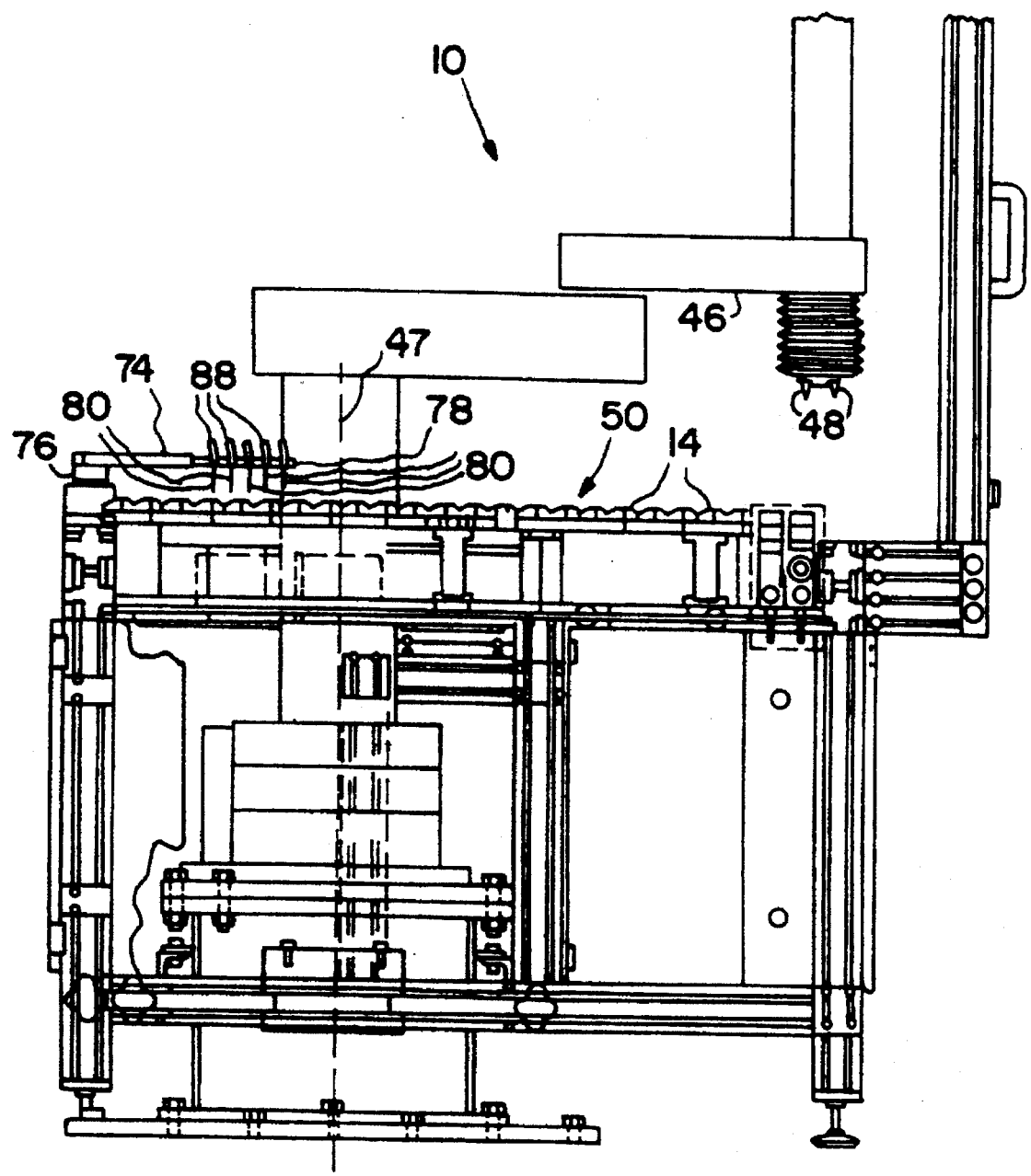
FIG. 4 is a left elevational view of the designed embodiment of FIGS. 2 and 3.

At the fourth angular position, referring to FIGS. 2, 3 and 4, a pivotable arm 74, pivotally supported by a column 76, supports a plate 78 which holds a 2×5 array of dosing tubes 80, each of which is supplied by a separate dosing pump 82. Each dosing tube 80 deposits a precise dosage of saline solution into the cavity 24 in each blister pack base 16, such that each contact lens 26 is completely immersed in saline solution. The rate of pumping of saline solution and the diameter of each dosing tube 80 is chosen such that no saline solution splashes from any of the cavities of any of the blister packs, which is very important as any saline solution splashed onto any sealing flange 18 surfaces would interfere with subsequent sealing and packaging operations.

Periodically, such as every four minutes, the pivotal arm 74 carrying the array of dosing tubes 80 swings away and a reservoir 82, shown schematically with dosing pumps 82 in FIG. 2, is resupplied with saline dosing solution. The diameter of each dosing tube 80, FIG. 4, and the pumping rate therethrough have been determined empirically, with the internal diameter of each dosing tube 80 being approximately ⅛ inch, and the pumps 84 being positive displacement ⅜ or ½ inch diameter piston metering pumps, as are available from Oyster Bay Pump Works. The amount of saline solution pumped into each package base is 950 μliters±50 μliters.

The reservoir 82 of saline solution for all ten pumps and the ten pumps 84 are mounted on a pump cart 86 which is normally positioned adjacent to the position 4 station, and the pumps 84 are connected to the dosing tubes 80 by a plurality of ten flexible plastic tubes 88. Saline solution is available in the plumbing of the building in which the rotary packaging station is located to refill the reservoir. After approximately every four minutes of inactivity, the support arm 74 is manually rotated to one side to position the dosing tubes 80 over a collection pan 90 in the rotary packaging station, and each pump 84 is cycled a number (e.g., five) of times, with the discharge from the tubes being collected in the collection pan 90. The five cycles prime each pump to compensate for evaporation of saline solution and to ensure that the proper dosage amount is provided. The frequency at which the pumps are primed depends to an extent upon the particular industrial environment and temperature in which the rotary packaging station is located.

At the fifth angular position, referring to FIGS. 2 and 3, the presence of a measured dose (given level) of saline solution in each blister pack base is verified by a 2×5 array of liquid level detectors 92 positioned above the 2×5 array of blister pack bases. The detectors 92 are supported by a plate 94 which is pivotally supported on a column 96, such that the plate 94 and detectors 96 can be pivoted to a position not over the rotating index table 112. Each detector can be a reflective sensor as is commercially available from Omron, or could be an ultrasonic detector, or could be a proximity sensor or could be a fiber optic probe, as commercially available from Keyence as model 24W-V25R, used with an amplifier, model 24W-AA1C. Each detector checks and verifies for a proper height of saline solution in each blister pack base. The verification of a measured dosage of saline solution at the fifth angular position can be considered to be optional, particularly if the reliability of the dosing equipment at the fourth angular position is high.

At the sixth angular position, a pair of laminar top sheets 100, FIG. 1, is placed over the 2×5 array of package bases. Each laminar top sheet covers a 1×5 column of bases, and has printed thereon all identification indicia required for the final package. The laminar top sheet is prepared pursuant to the disclosure of patent application Ser. No. 08/106,386, filed Aug. 13, 1993 now abandoned. The laminar top sheet is produced by a labeling machine which extends to the right of the rotary packaging machine as illustrated in FIGS. 1 and 2. The laminar top output sheet 100 of the labeling machine is placed by a foil pick and place unit 102, illustrated schematically in FIG. 1, having an array of suction cups 104 to lift and place the laminar top sheet 100 over the top of the 2×5 array of package bases.

At the seventh angular position, referring to FIGS. 10, 11, 12 and 13, the top sheet is heat sealed to the base containers of the blister packs. A heated seal head 110, FIGS. 12 and 13, heated by a plurality of electric heaters 112 (illustrated as five in the embodiment of FIG. 13 and as two in the embodiment of FIG. 13) mounted in a heating plate 114. The heating plate 114 is secured to the back of the seal head 110, and is supported by a pneumatic cylinder or press 116 which presses the heated seal head 110 against the laminar top sheets 100 on the package bases 16, which are supported by the pallet such that the foil laminate and base container flanges are squeezed between the heated seal head and the pallet as supported by the rotary index table. The heated seal head is electrically heated, and the temperature thereof is measured by thermal transducers 118 on each side of the seal head 110 to maintain the temperature at a high temperature, when compared to similar prior art arrangements. The temperature is maintained in a range from 210°–265° C.

The heated seal head comprises a 2×5 array of cylindrical sealing elements 120, each of which secures the top laminar sheet to each package base 16 with an annular seal around the cavity 24 in the package base 16. The pneumatic cylinder is coupled to the heated seal head by a mount jack bolt 122 and cylindrical support struts 124. The support struts 124 are biased upwardly by springs 126, such that the heated seal head is raised and normally biased to the upper position illustrated in FIG. 10, unless the pneumatic cylinder 116 forces it down for a sealing operation.

In operation, the back force generated by the pneumatic cylinder is measured by an in-line load cell 128, and a solid state timer is initiated when a force is reached of a given percentage, e.g., 60–75%, of the peak force of which the pneumatic cylinder is capable. The solid state timer times a relatively short time period of approximately 0.4 to 1.4 seconds, after which the pressure in the pneumatic cylinder 116 is released. This approach, when compared with similar prior art approaches, is very hot, very hard and very short, which creates a seal which is both detachable and consumer friendly.

The rotary index table 12 is preferably reinforced under the seventh angular position to withstand the heat sealing forces imparted thereto by the pneumatic cylinder 116. The rotary index table 12 must be maintained in a substantially level position for the operations described herein. The pneumatic cylinder 116 at the seventh position applies a substantial force to the index table, and accordingly to maintain the index table level, an approximately 2½×3½ inch support block 130 of a durable plastic material, similar to Teflon®, is placed on top a central support 132 and surrounding supports 134 positioned beneath the pneumatic press. The support block 130 is in constant contact with the rotary index table 12 to ensure that the deflection of the rotary index table 12 under the pneumatic cylinder 116 is minimal. Alternatively, a pneumatically actuable movable support could be positioned in contact with the bottom of the rotary index table prior to operation of the pneumatic cylinder driving the heated seal head, and be repositioned out of contact with the bottom of the rotary index table after operation of the pneumatic cylinder.

Figure 14:
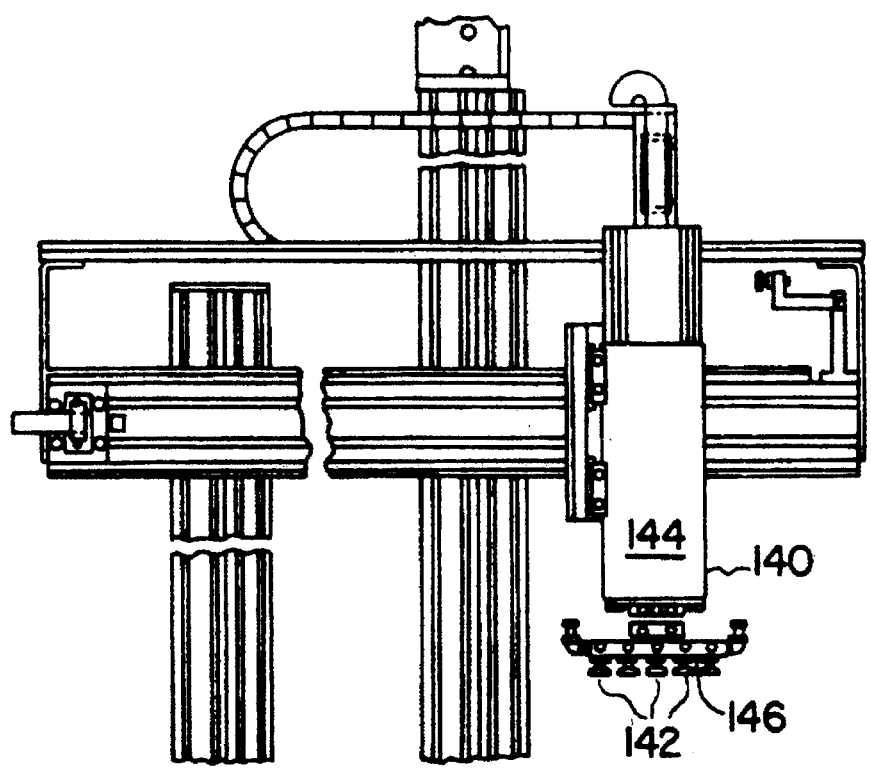
FIG. 14 is an elevational view of the pick and place unit at the package unloading station.
Figure 15:
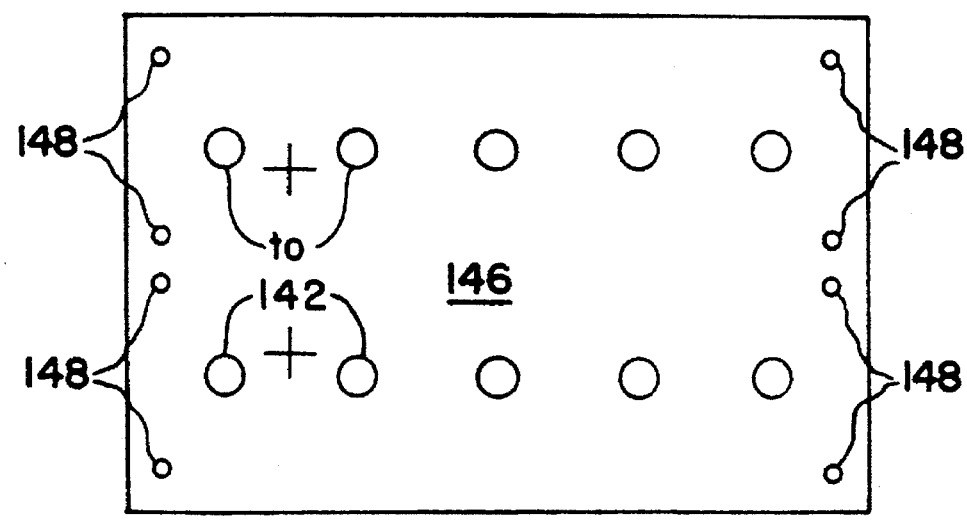
FIG. 15 is a plan view of the sensor mounting arrangement for a skew foil detector mounted in the pick and place unit of FIG. 14.

At the eighth angular position, referring to FIGS. 14 and 15, a pneumatically driven handling arm 140, having a vacuum suction cup 142 for each individual blister pack, lifts the 2×5 array of blister packs from the support pallet 14 and the rotary index table, and deposits the array of blister packs to an output position. The handling arm 140 driven by a vertical pneumatic cylinder 144 and a horizontal pneumatic cylinder, not shown—positioned behind cylinder 144, and also incorporates thereon a precision sensor plate 146 having a plurality of photoelectric sensors 148 which look at and examine the outer edges of the foil cover 100 on each 1×5 array of blister packs. The photoelectric sensors are preferably positioned at the corners of the expected position of the sheet of laminated covers on the array. Accordingly, if the laminated foil is properly positioned relative to the 2×5 array of packages, each sensor will detect the corner of the foil therebelow. If at least one corner detector does not detect the presence of the corner of the laminated foil therebelow, it means that the foil cover is skewed relative to the 2×5 array of packages, or is improperly cut short or long.

After being deposited at the output position, the packages may then be subjected to sterilization, as in the instance when the product housed therein is intended to be employed in a medical capacity, for example, a product such as a contact lens which is adapted to be packed in a sterile saline solution and sealed in a compartment or cavity of the package. The blister packs can then be subjected to a secondary packaging operation, such as one in which packages of 1×5 blister packs are placed in a final outer package.

It is noted that the dosing verification at angularly spaced position 4 may be eliminated in some embodiments. Accordingly, in alternative embodiments, the rotary index table could be designed with fewer (or more) support pallets 14, positioned radially therearound, depending upon the number of different functions to be accomplished by the rotary packaging station. Moreover, linear packaging arrangements having linear conveyor lines with linearly spaced stations therealong are also contemplated in alternative embodiments of the present invention.

While several embodiments and variations of the present invention for a rotary packaging station are described in detail herein, it should be apparent that the disclosure and teachings of the present invention will suggest many alternative designs to those skilled in the art.

What is claimed is:

1. A packaging arrangement for packaging products, comprising:
   a. a movable support base having on its upper surface a plurality of substantially identical support pallets, spaced equally apart along the movable support base, each of which supports and aligns an array of individual package bases;
   b. means for sequentially moving the support base through substantially equal incremental movements, with stops between each sequential movement, wherein each support pallet with an array of individual package bases thereon is sequentially stopped at spaced stations in the packaging arrangement;
   c. at a first station, a loader unit for loading an array of package bases in the support pallet then at the first station;
   d. at a subsequent foil placement station, a placer unit for placing a sheet of laminated covers over the array of package bases;
   e. at a subsequent heat sealing station, a heated seal head for heat sealing the laminated covers to the package bases, and comprising an electrically heated seal head driven by a pneumatic cylinder against the laminated covers on the package bases, which are supported by the pallet and the support base, and wherein an in-line load cell measures the force generated by the pneumatic cylinder, and when a predetermined force is detected by the in-line load cell, a timer is initiated which times a given period of time, after which pressure in the pneumatic cylinder is released, thereby forming a seal between each laminated top cover and package base which is both detachable and consumer friendly; and
   f. at a subsequent unloading station, an unloader for unloading the sealed packages from the packaging arrangement for subsequent processing.

2. A packaging arrangement as claimed in claim 1, wherein the unloader comprises a handling arm, having a vacuum suction cup for each individual package, which lifts the array of packages from the support pallet on the movable support base, and deposits the array of packages at an output position.

3. A packaging arrangement as claimed in claim 1, wherein at the first station, the packaging arrangement receives individual blister package bases, each of which has a contact lens therein, whereby the packaging arrangement packages contact lenses into the blister packages.

4. A packaging arrangement as claimed in claim 1 wherein a detector measures the temperature of the seal head to maintain the temperature in a range from 210°–265° C.

5. A packaging arrangement as claimed in claim 1, wherein the timer times a relatively short time period of approximately 0.4 to 1.4 seconds, thereby forming a seal between each laminated cover and package base which is both detachable and consumer friendly.

6. A packaging arrangement as claimed in claim 1, wherein at a subsequent saline dosing station, dosers deposit a given dosage of saline solution in each package base.

7. A packaging arrangement as claimed in claim 6, wherein after the saline depositing station, at a subsequent depositing verification station, an array of sensors verifies that a fixed dosage of saline solution has been deposited into each package base.

8. A packaging arrangement as claimed in claim 6, wherein at the saline dosing station, a pivotable arm supports an array of dosing tubes, each of which is supplied by a separate dosing pump to deposit a precise dosage of saline solution into each package base.

9. A packaging arrangement as claimed in claim 8, wherein a pump cart is positioned adjacent to the saline dosing station and mounts thereon the dosing pumps and a reservoir of saline solution for the dosing pumps, and periodically the support arm is rotated to position the dosing tubes over a collection pan, and each pump is cycled several times, with the discharge from the dosing tubes being collected in the collection pan.

10. A packaging arrangement as claimed in claim 1, wherein the movable support base is maintained in a substantially level position by a reinforcement support under the heat sealing station to withstand the forces imparted thereto by the pneumatic cylinder.

11. A packaging arrangement as claimed in claim 10, wherein the movable support base is reinforced by a support beneath the movable support base at the pneumatic cylinder, to ensure that deflection of the movable support base by the pneumatic cylinder is minimal.

12. A packaging arrangement as claimed in claim 1, wherein each package base includes a rounded product cavity and a plurality of alignment notches on opposite sides of the package base, and the support pallet defines a rounded cavity for receiving each product cavity of each package base and a plurality of alignment rods which fit into the plurality of alignment notches on opposite sides of each package base.

13. A packaging arrangement for packaging products, comprising:
   a. a movable support base having on its upper surface a plurality of substantially identical support pallets, spaced equally apart along the movable support base, each of which supports and aligns an array of individual package bases;
   b. means for sequentially moving the support base through substantially equal incremental movements, with stops between each sequential movement, wherein each support pallet with any array of individual package bases thereon is sequentially stopped at spaced stations in the packaging arrangement;
   c. at a first station, a loader unit for loading an array of package bases in the support pallet then at the first station;
   d. at a subsequent foil placement station, a placer unit for placing a sheet of laminated covers over the array of package bases;
   e. at a subsequent heat sealing station, a heated seal head for heat sealing the laminated covers to the package bases; and f. at a subsequent unloading station, an unloader for unloading the sealed packages from the packaging arrangement for subsequent processing, wherein the unloader comprises a handling arm which lifts the array of packages from the support pallet on the movable support base, and deposits the array of packages at an output position, wherein the handling arm incorporates thereon a precision sensor plate which defines thereon a placement position for a cover sheet relative to the precision sensor plate, said placement position being defined by a plurality of photoelectric sensors mounted on the precision sensor plate around the perimeter of and surrounding the placement position, with each of the plurality of photoelectric sensors detecting an edge of a cover sheet in the placement position, and wherein if one of the plurality of photoelectric sensors does not detect an edge of a cover sheet, the cover sheet is improperly positioned or is not properly sized.

14. A packaging arrangement as claimed in claim 13, wherein the photoelectric sensors are positioned at corners of the placement position of the cover sheet.

15. A packaging arrangement as claimed in claim 13, wherein the handling arm has a vacuum suction cup for each individual package.

16. A packaging arrangement for packaging products, comprising:
   a. a movable support base having on its upper surface a plurality of substantially identical support pallets, spaced equally apart along the movable support base, each of which supports and aligns an array of individual package bases;
   b. means for sequentially moving the support base through substantially equal incremental movements, with stops between each sequential movement, wherein each support pallet with an array of individual package bases thereon is sequentially stopped at spaced stations in the packaging arrangement;
   c. at a first station, a loader unit for loading an array of package bases in the support pallet then at the first station;
   d. at a subsequent foil placement station, a placer unit for placing a sheet of laminated covers over the array of package bases;
   e. at a subsequent heat sealing station, a heated seal head for heat sealing the laminated covers to the package bases;
   f. at a subsequent unloading station, an unloader for unloading the sealed packages from the packaging arrangement for subsequent processing; and
   g. first and second side by side accumulator rails, wherein the first accumulator rail accumulates and positions a first plurality of individual package bases, each of which has a product therein, in a first queue line, and the second accumulator rail accumulates and positions a second plurality of individual package bases, each of which has a product therein, in a separate and discrete second queue line side by side with the first queue line, and the package bases are transferred from the first and second queue lines on the first and second accumulator rails by the loader unit to the movable support base.

17. A packaging arrangement as claimed in claim 16, further including means for precisely positioning the package bases on the first and second side by side accumulator rails, and a robotic handling arm, having an array of vacuum handling cups, one for each individual package base, picks up an array of package bases and deposits the array of package bases onto a support pallet at the first station on the movable support base.

18. A packaging arrangement as claimed in claim 17, wherein the robotic handling arm transfers package bases from the first and second accumulator rails to a support pallet positioned at the first station, and also transfers package bases between the first and second accumulator rails and a buffer area.

19. A packaging arrangement as claimed in claim 17, wherein after the package bases are deposited onto one end of the first and second side by side accumulator rails, first and second pneumatic cylinders advance the package bases to the second opposite end of the first and second accumulator rails, and a third pneumatic cylinder at the second end of the first and second accumulator rails then precisely positions the package bases at the second end of the first and second accumulator rails relative to the robotic handling arm to allow the robotic handling arm to pick up and place an array of package bases in a support pallet at the first station.

20. A packaging arrangement as claimed in claim 17, wherein the support pallet spaces a side of each package base a nominal distance, in a range of 200 to 400 $\mu$meters, from a side of an adjacent package base in the support pallet, to prevent overlapping sides of adjacent package bases, and wherein the first and second side by side accumulator rails accumulate package bases in positions in which package bases directly touch adjacent package bases, and to compensate for a slight difference in spacing from the nominal distance between adjacent package bases in the pallet, the robotic handling arm, after positioning an array of package bases over a pallet, releases a vacuum in each vacuum cup to allow the package bases to fall into the support pallet, and then raises and lowers the array of vacuum handling cups slightly to tap each package base into a properly aligned position in the support pallet.

21. A packaging arrangement for packaging products, comprising:
   a. a movable support base having on its upper surface a plurality of substantially identical support pallets, spaced equally apart along the movable support base, each of which supports and aligns an array of individual package bases;
   b. means for sequentially moving the support base through substantially equal incremental movements, with stops between each sequential movement, wherein each support pallet with an array of individual package bases thereon is sequentially stopped at spaced stations in the packaging arrangement;
   c. at a first station, a loader unit for loading an array of package bases in the support pallet then at the first station;
   d. at a subsequent foil placement station, a foil placer unit for placing a sheet of laminated foil covers over the array of package bases, wherein the foil placer unit comprises a foil pick and place unit, having an array of suction cups, which simultaneously lifts and places at least one sheet of laminated foil covers over the array of package bases;
   e. at a subsequent heat sealing station, a heated seal head for heat sealing the laminated foil covers to the package bases;
   f. at a subsequent unloading station, an unloader for unloading the sealed packages from the packaging arrangement for subsequent processing; and
   g. at a subsequent verification station after the first station, an array of fiber optic probes are positioned above the array of package bases, with each fiber optic probe illuminating a package base, and then detecting radiation reflected therefrom to verify a presence of each package base in the support pallet, and further including at least one alignment probe for verifying alignment of the packaging bases in the support pallet to check that no package bases are skewed or tilted in the support pallet.

22. A packaging arrangement as claimed in claim 21, wherein the foil pick and place unit simultaneously lifts and places two sheets of laminated foil covers over the array of package bases.

23. A packaging arrangement as claimed in claim 21, wherein said at least one alignment probe includes a through-beam detector which directs a beam of light along the length of and just above a column of package bases supported in the pallet to a detector at the other end of the column, such that a package base which is skewed or titled in the pallet interrupts the through beam, and the detector at the other end of the through beam so indicates.

24. A packaging arrangement which verifies a proper positional placement of a cover sheet on package bases, comprising a precision sensor plate which defines thereon a placement position for a cover sheet relative to the precision sensor plate, said placement position being defined by a plurality of photoelectric sensors mounted on the precision sensor plate, positioned at corners of the placement position of the cover sheet, with each of the plurality of photoelectric sensors detecting an edge of a cover sheet in the placement position, and wherein if one of the plurality of photoelectric sensors does not detect an edge of a cover sheet, the cover sheet is improperly positioned or is not properly sized.

25. A packaging arrangement which verifies a proper positional placement of a cover sheet on package bases, comprising a precision sensor plate which defines thereon a placement position for a cover sheet relative to the precision sensor plate, said placement position being defined by a plurality of photoelectric sensors mounted on the precision sensor plate around the perimeter of and surrounding the placement position, with each of the plurality of photoelectric sensors detecting an edge of a cover sheet in the placement position, and wherein if one of the plurality of photoelectric sensors does not detect an edge of a cover sheet, the cover sheet is improperly positioned or is not properly sized, and wherein the precision sensor plate is mounted on a transfer mechanism.

26. A packaging arrangement as claimed in claim 25, wherein the transfer mechanism comprises a pneumatically driven robotic handling arm which lifts the package bases by vacuum cups from a first position and deposits them at a second position.

\* \* \* \* \*